Patented Aug. 1, 1939

2,167,804

UNITED STATES PATENT OFFICE 2,167,804

DYESTUFFS CONTAINING SIMULTANEOUSLY RADICALS OF ANTHRAQUINONE DYESTUFFS AND AZO DYESTUFFS AND PROCESS OF MAKING THE SAME

Hans Gubler and Eduard Bernasconi, Basel, Switzerland, assignors to firm of Society of Chemical Industry in Basle, Basel, Switzerland No Drawing. Application October 26, 1935, Serial No. 46,956. In Switzerland November 8, 1934

19 Claims. (Cl. 260—153)

According to this invention new dyestuffs which contain simultaneously a radical of an azo dyestuff and of an anthraquinone dyestuff are made by combining a dyestuff of the anthraquinone series containing at least one reactive amino-group with an amino-azo dyestuff with the aid of a halide of an organic acid or an analogue thereof, the components for the dyestuff being selected so that at least one of them contains a group which imparts solubility in water.

According to a further feature of the invention, like dyestuffs can also be made by converting an anthraquinone dyestuff containing at least one reactive amino-group with the aid of a halide of an organic acid or an analogue thereof into a compound which can itself be converted into an aminoazo dyestuff derivative either by diazotization and combination with a coupling component or by combination with a diazo-compound, and then converting the compound thus obtained into the aminoazo dyestuff derivative according to either of these methods.

Among anthraquinone dyestuffs containing amino-groups suitable for use in the invention are included simple amino-anthraquinones as well as anthraquinone derivatives containing an amino-group in an external group, such as is the case, for instance, in aminobenzoylaminoanthraquinones or aminophenylated-aminoanthraquinones. By the expression "anthraquinone dyestuffs" are to be understood not only such products which contain the unchanged anthraquinone radical

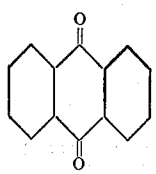

but also the dyestuffs which are quite generally regarded as anthraquinone dyestuffs, such as inter alia the dyestuffs of the dibenzanthrone, pyranthrone, pyrazolanthrone, anthanthrone and dibenzpyrene-quinone series.

By halides of organic acids and their analogues are to be understood above all such compounds which behave like halides of polyvalent organic acids, such as dichlorides of terephthalic- and isophthalic-acid of the formulas

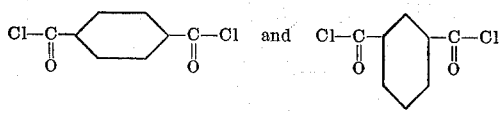

dichlorides of dioxyphenyl-acetic acids, such as

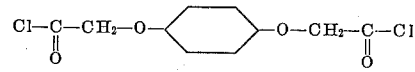

furthermore a halide of a heterocyclic compound characterized by a heterocyclic six-membered ring consisting itself only of N and C atoms and of at least 3 and at the most 4 carbon atoms and of at least 2 and at the most 3 nitrogen atoms, and in which ring the atom grouping halogen

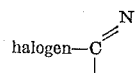

is present at least twice and at the most three times, such as cyanuric chloride of the formula

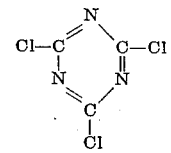

cyanuric bromide of the formula

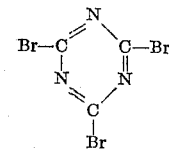

dichlorophthalazine of the formula

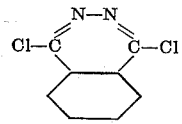

dichloroquinazoline of the formula

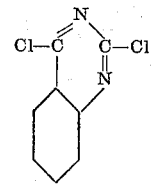

tribromopyrimidine of the formula

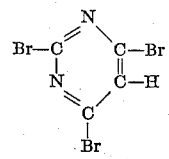

and so on. However, there come into consideration also products which are to be regarded as derivatives of mono-basic acids, for example, nitrobenzoyl chlorides such as

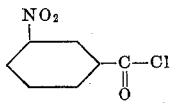

nitro- or acidyl-amino-derivatives of anhydrides or halides of other aromatic or fatty aromatic carboxylic acids, such as hydroxyphenylacetic acid or phenylacetic acid of the formula

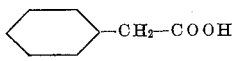

In many cases, as will be understood, a reduction or a saponification must be applied at some suitable stage in the manufacture of the products.

Depending on the choice of the anthraquinone dyestuff and the amino-azo dyestuff, the dyestuffs obtained in accordance with the invention may dye yellow, orange, red, violet, blue or green. It is also possible to prepare compounds which yield various brown and black shades. The new dyestuffs may be distinguished by their productivity and by the brightness and high fastness to light of their dyeings. Especially valuable are the green dyestuffs which are obtained by combining a blue element of the anthraquinone series with a yellow element of the azo series. When the new dyestuffs contain a suitable atomic grouping such as that of salicylic acid they may advantageously be converted in substance or on the fiber into complex metal compounds such as compounds of copper or chromium.

The new dyestuffs are therefore characterized by containing, on the one hand, the radical of an amino-anthraquinone dyestuff and, on the other hand, at least once the radical of an aminoazo dyestuff, in which dyestuffs these radicals are linked together by the radical of a compound which behaves like a halide of a polyvalent organic acid, and in which further at least one of the dyestuff radicals contains at least one sulfo-group. Among these dyestuffs are particularly valuable in which the radical of the anthraquinone dyestuff is the radical of a blue amino-anthraquinone dyestuff, and in which the radicals of the azo dyestuffs are the radicals of yellow aminoazo dyestuffs. Such blue amino-anthraquinone dyestuffs are for example the polyamino-anthraquinones, such as for example 1:4:5:8-tetra-aminoanthraquinones, polyamino-hydroxy-anthraquinones, for example 1:4:5-triamino-8-hydroxyanthraquinones or 1:5-diamino-4:8-di-hydroxyanthraquinones, further 1 - amino - 4 - amino-arylido-anthraquinones and the sulfonic acids of such compounds, such as sulfonic acids of the 1-amino-4(4'-aminophenyl) amino-anthraquinones. As yellow aminoazo-dyestuffs there come into question quite generally those dyestuffs which may be obtained by combining a diazotized aromatic monoacidyl-diamine of the benzene series with a so-called yellow component, such as phenol, salicylic acid, the cresotinic acids, pyrazolones, such as 1-aryl-5-pyrazolones, arylides of the acetoacetic acid, di-hydroxyquinoline, methylketol, etc.

These dyestuffs are dark powders which dissolve in water to green-blue to green and green-olive solutions and dye cotton or quite generally textiles which consist of or contain regenerated cellulose similar tints. The dyeings are characterized by excellent fastness to light. The new dyestuffs are useful for dyeing textile materials, such as natural fibers like cotton or natural silk, for dyeing artificial silk of regenerated cellulose, for the manufacture of pigments and for coloring lacquers or varnishes. In the latter case it may be useful to precipitate the dyestuffs with the aid of suitable compounds.

The following examples illustrate the invention the parts being by weight:

Example 1

A solution of 25.7 parts of 4-amino-4'-hydroxy-1:1'-azobenzene-3'-carboxylic acid in 800 parts of water is added gradually to a suspension of 18.5 parts of cyanuric chloride in 800 parts of water at 5° C. whilst well stirring. There are simultaneously added 4 parts of sodium carbonate in the form of a solution of 10 per cent. strength, drop by drop, so that the reaction remains weakly acid throughout. After 4 hours the condensation is finished and the condensation product has separated in the form of fine golden-yellow leaflets. To the suspension there is then added a neutral solution of 48.9 parts of 1-amino-4-(4'-amino-3'-sulfo)-anilido-anthraquinone-2-sulfonic acid in 2000 parts of water. The whole is now stirred for 24 hours at 40° C., the liberated acid being neutralized by addition of a solution of sodium carbonate. When the condensation is finished 18.6 parts of aniline are added and the whole is heated for 2 hours at 90–95° C. The whole is then made alkaline with sodium carbonate and the dyestuff formed is salted out. It corresponds to the formula

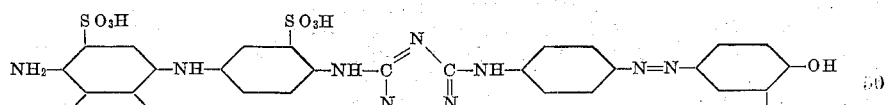

and dyes cotton and viscose a pure yellowish-green of very good fastness to light. A similar product is formed when using instead of the 1-amino - 4(4' - amino - 3' - sulfo) anilido - anthraquinone-2-sulfonic acid the probably isomeric compound obtained by sulfonating and saponifying the 1-amino-4(4'-acetamino)-anilido-anthraquinone-2-sulfonic acid. It corresponds probably to the formula

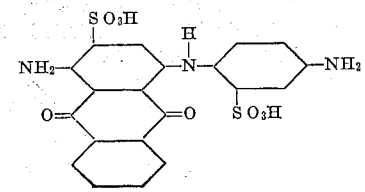

By after-treatment of the fiber with an agent yielding copper the dyeing may be fixed so that it is fast to washing.

wherein $R_1$ represents hydrogen, alkyl, aralkyl or aryl, and $R_2$ hydrogen, alkyl or aralkyl. Thus the dyestuff of the formula

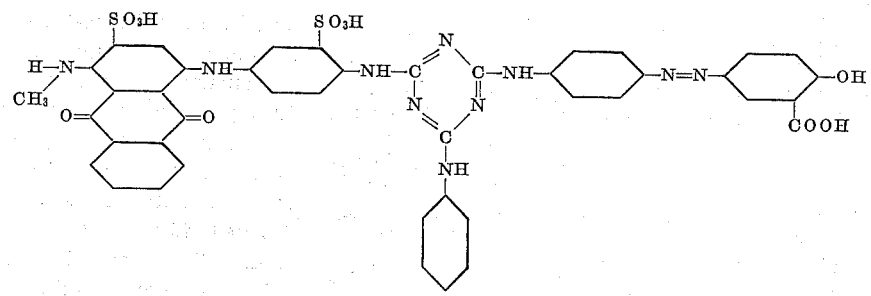

If the last condensation in the foregoing example is conducted with a further quantity of 4-amino-4'-hydroxy-1:1'-azobenzene-3'-carboxylic acid instead of with aniline there is obtained a dyestuff yielding somewhat more yellowish-green shades. Green dyestuffs are quite generally obtained when replacing the aniline not only by a yellow aminoazo-dyestuff but by any organic amino compound which is colorless to yellow, such as monomethylamine, diethylamine, butylamine, hexahydroaniline, monomethylaniline, dehydrothiotoluidine, nitrated aminodiphenylamines, and the like. However, if the aniline is replaced by the radical of a dyestuff whose color tends more to the blue side of the spectrum, for example, by the red azo-dyestuff of the formula

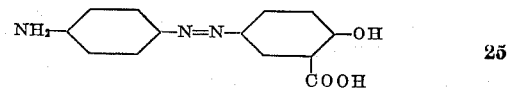

there are obtained olive to brown tints. A pure blue dyestuff, for example a blue amino dyestuff of the anthraquinone series instead of aniline, leads again to green tints. If, in the example, instead of the anthraquinone derivative named there is used 1-methyl-amino-4-benzidino-anthraquinone which has been rendered soluble in water by appropriate sulfonation there is obtained a dyestuff yielding similar very pure green shades. Instead of with a diphenyl radical the external amino-group can also be linked with the anthraquinone nucleus by another aromatic radical, for example a naphthalene, a carbazol, a diphenylether radical, and the like. Valuable dyestuffs are also obtained with such derivatives of the 1-amino-4(4'-amino)-anilido-anthraquinone which are sulfonated in 6- or 7-position, or in which the 1-amino-group is replaced by an $$\mathrm{N} \begin{array}{c} R_1 \\ \diagdown \\ \diagup \\ R_2 \end{array} \text{—group}$$

for example, dyes viscose artificial silk green tints. If in the aminoazo-dyestuff the radical of the salicylic acid is replaced by a radical of a cresotinic acid, the shade is shifted from green towards olive-green. Green dyestuffs are not only obtained by using the aminoazo-dyestuff of the formula

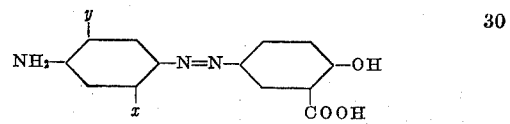

but quite generally by the dyestuffs which correspond to the general formula $$NH_2-\bigcirc-N=N-\bigcirc \begin{matrix} y \\ -OH \\ x \\ COOH \end{matrix}$$

wherein $y$ stands for H, $CH_3$ or $OCH_3$, and $x$ stands also for H, $CH_3$ or $OCH_3$.

*Example 2*

A solution of 43 parts of 1:5-dihydroxy-4:8-diaminoanthraquinone-2:6-disulfonic acid in 2000 parts of water is added to a solution in 1600 parts of water of 40.5 parts of the condensation product obtained as described in Example 1 from cyanuric chloride and 4-amino-4'-hydroxy-1:1'-azobenzene-3'-carboxylic acid. Condensation is brought about by heating at 40° C. for 24 hours, the reaction being maintained neutral throughout. 18.6 parts of aniline are then added and the whole is heated for 2 hours longer at 90–95° C. whilst stirring and then allowed to cool. The dyestuff of the formula

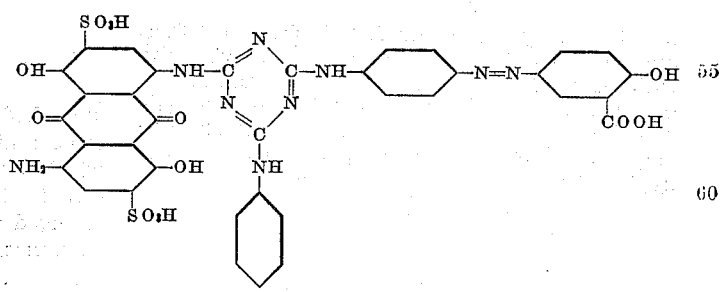

which has separated is filtered; it may be purified by reprecipitating it from a solution in sodium carbonate solution. The dyestuff dyes cotton and viscose pure yellow-green shades which are fast to light and on after-treatment with an agent yielding copper become yellower and, at the same time, fast to washing. Also in this case the aniline may be replaced by monomethylaniline, monomethylamine or a further aminoazo-dyestuff.

Example 3

A neutral solution of 30.7 parts of the amino-azo-dyestuff from diazotized 1-aminobenzene-3-sulfonic acid and 1-amino-2-methoxybenzene in 800 parts of water is added to a fine suspension of 18.5 parts of cyanuric chloride in 1000 parts of water. The whole is stirred for 3-4 hours at 15° C., the liberated acid being neutralized with the aid of 50 parts of a solution of sodium carbonate of 10 per cent. strength. When the condensation is finished 40.9 parts of 1-amino-4-(4'-amino)-anilidoanthraquinone-2-sulfonic acid in 3000 parts of water are added and condensed analogously to Example 2. The whole is finally heated with 18.6 parts of aniline for 2 hours at 90-95° C. Then 20 parts of sodium carbonate are added and the dyestuff formed of the formula

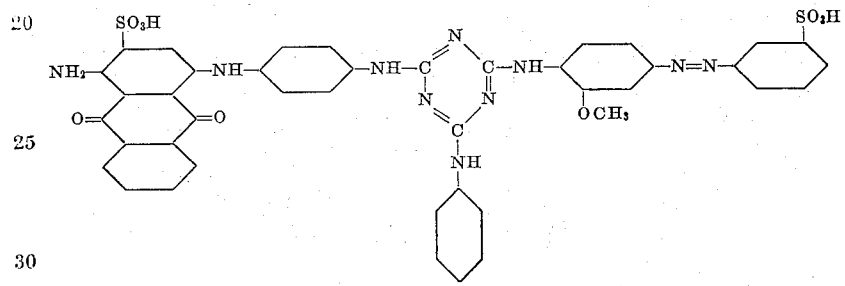

is salted out. It dyes cotton and viscose pure yellow-green shades of very good fastness to light. Also in this case the yellow dyestuff of the formula

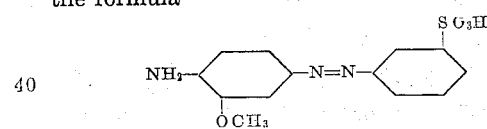

may quite generally be replaced by products of the general formula

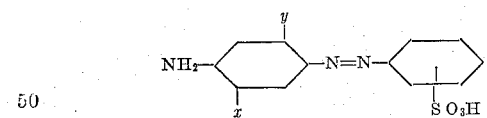

in which $x$ and $y$ stand for H, $CH_3$ or $OCH_3$, and in which the benzene radical carrying the sulfo-group may be substituted by $CH_3$, halogen or alkoxy, such as 4-amino-1:1'-azobenzene-4'-sulfonic acid. The replacement of the sulfonic acid of the benzene series by a sulfonic acid of the naphthalene series, for example by

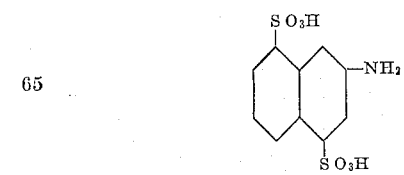

leads to a dull green. If instead of 1-amino-4-(4'-amino)-anilido-anthraquinone-2-sulfonic acid there is used for the condensation 1-amino-4-(3'-amino)-anilido-anthraquinone-2-sulfonic acid the shade is shifted towards olive-green.

Example 4

A solution in 1500 parts of water of 48.9 parts of the condensation product from 1-amino-4-bromanthraquinone-2-sulfonic acid and 1:4-diaminobenzene-3-sulfonic acid is added to a fine suspension of 18.5 parts of cyanuric chloride in 1000 parts of water. The whole is stirred for 4-5 hours at 15-20° C., the reaction being maintained neutral by addition of a solution of sodium carbonate. As soon as the condensation is finished 25.5 parts of the amino-azo-dyestuff from diazotized 1-aminobenzene-3-carboxylic acid and meta-toluidine are added in 1000 parts of water. The whole is stirred at 40° C. for 24-30 hours, the reaction being maintained neutral throughout. The product is then further condensed with 18.6 parts of aniline at 90-95° C. as in the foregoing examples and the dyestuff of the formula

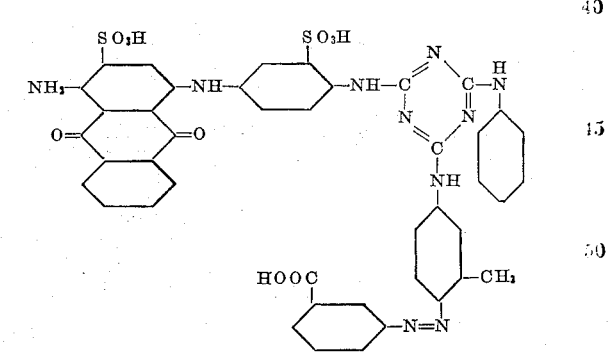

is worked up in the usual manner. It dyes vegetable and animal fibers yellowish-green shades which are fast to light. Also in this case the constitution of the yellow azo-dyestuff can be changed according to the data of the preceding examples.

Example 5

Into 63.7 parts of the mono-condensation product obtained as described in Example 4 from cyanuric chloride and 1-amino-4-(4'-amino-3'-sulfo)-anilidoanthraquinone-2-sulfonic acid in 2500 parts of water there is poured a neutral solution in 2000 parts of water of 37.6 parts of the amino-azo-dyestuff which is obtained by diazotizing 4-nitro-1-aminobenzene-2-sulfonic acid, combining with aceto-acetic anilide and reducing the nitro-group. Condensation is conducted as described in the foregoing examples at 40° C. and finally the third chlorine atom in the cyanuric radical is replaced by aniline. The dyestuff so obtained of the formula

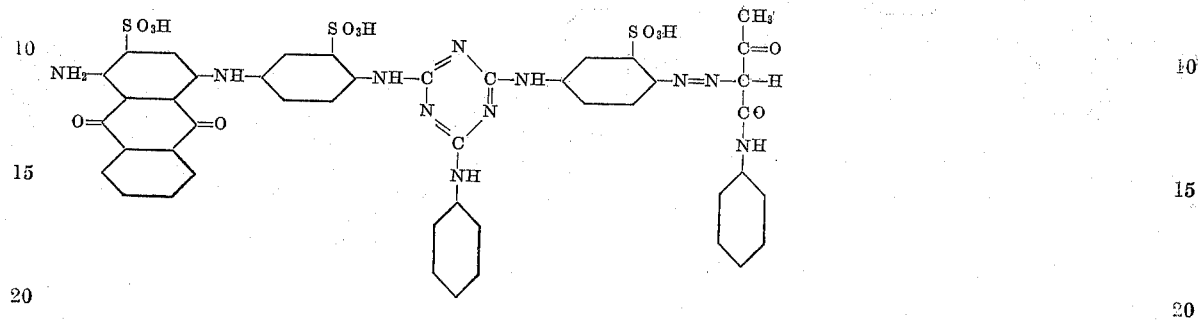

dyes cotton and viscose a very pure green having a strong yellowish hue and having good fastness to light. Green dyestuffs with yellowish hue are obtained by replacing the aceto-acetic anilide by other yellow components with a $CH_2CO$-group capable of coupling, such as pyrazolone derivatives, barbituric acid derivatives, and the like. If, instead of aniline, there is used para-, ortho- or meta-diaminobenzene or 4:4'-diaminodiphenyl or even methylamine there are obtained similar dyestuffs which, in some cases, may be further diazotized on the fiber.

*Example 6*

63.7 parts of the condensation product described in Example 4 from 1-amino-4-(4'-amino-3'-sulfo)-anilidoanthraquinone-2-sulfonic acid and cyanuric chloride in 2500 parts of water are condensed with 10.8 parts of 1:3-diaminobenzene at 40° C. When free phenylene-diamine can no longer be detected the solution is combined with 40.5 parts of the mono-condensation product from cyanuric chloride and 4-amino-4'-hydroxy-1:1'-azobenzene-3'-carboxylic acid, described in Example 1, in 2000 parts of water and the whole is stirred for 24-48 hours at 40-45° C. When condensation to the dicyanuric derivative is finished the whole is heated with 37.2 parts of aniline for 2 hours at 90-95° C. The dyestuff of the formula treated on the fiber with an agent yielding copper. Similar dyestuffs are obtained if, instead of 1:3-phenylenediamine, there is used 1:4-phenylene-diamine or a sulfonic acid thereof, or 4:4'-diaminodiphenylamine, diamino-stilbene-disulfonic acid or benzidine-disulfonic acid and so on.

*Example 7*

A neutral solution of 48.9 parts of the condensation product from 1-amino-4-brom-anthraquinone-2-sulfonic acid and 1:4-diaminobenzene-2-sulfonic acid in 2000 parts of water is poured into a fine suspension of 18.5 parts of cyanuric chloride in 1000 parts of water and the whole is stirred at 15-20° C. for 4-5 hours, the liberated acid being neutralized by addition of a solution of sodium carbonate. Then 31.9 parts of 1-amino-8-hydroxynaphthalene-3:6-disulfonic acid in 1000 parts of water are added and the whole is stirred for 24-30 hours at 40-50° C. Finally the product is condensed with 18.6 parts of aniline and the finished condensation product is salted out and filtered. The filter cake is re-dissolved in 2000 parts of water and 1000 parts of pyridine and the solution is combined with the diazotized amino-disazo dyestuff which is obtained by combining diazotized 1-amino-8-(4'-toluene-sulfo)-hydroxynaphthalene-3:6-disulfonic acid with 3-amino-4-cresol-methylether, diazotizing the product and combining with 2-amino-5-hydroxy-naphthalene-7-sulfonic acid. When the combination is finished the whole is heated to 80-90° C., 600 parts of an aqueous solution of sodium hy-

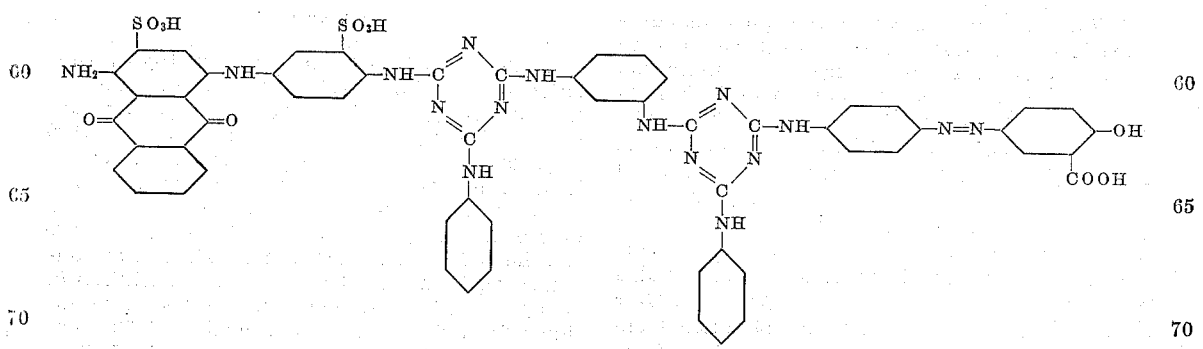

isolated in the usual manner, dyes cotton a green shade which is fast to light and can be afterdroxide of 35° Bé. are added and the whole is stirred for a short time at this temperature until the toluene-sulfo radical has been saponified. The dyestuff of the formula

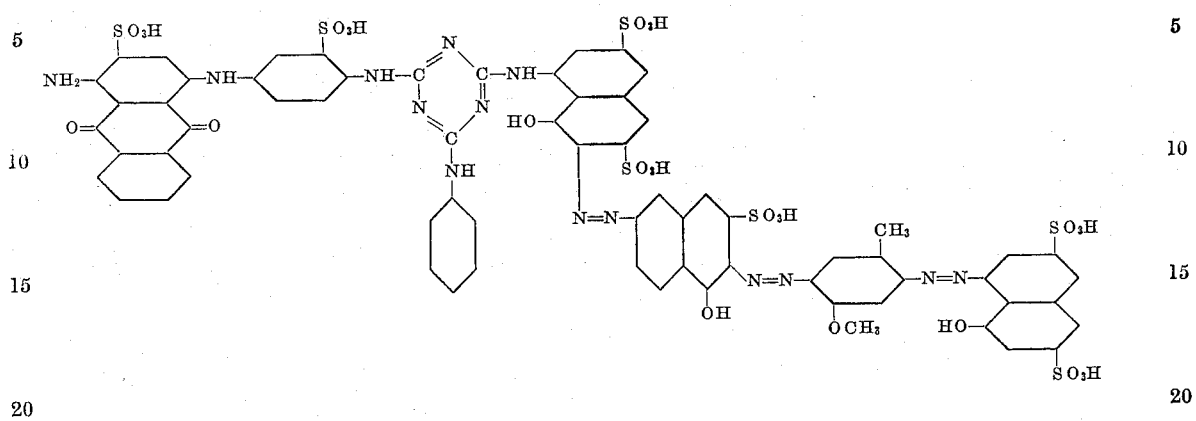

is then salted out. It dyes cotton blue shades of good fastness to light.

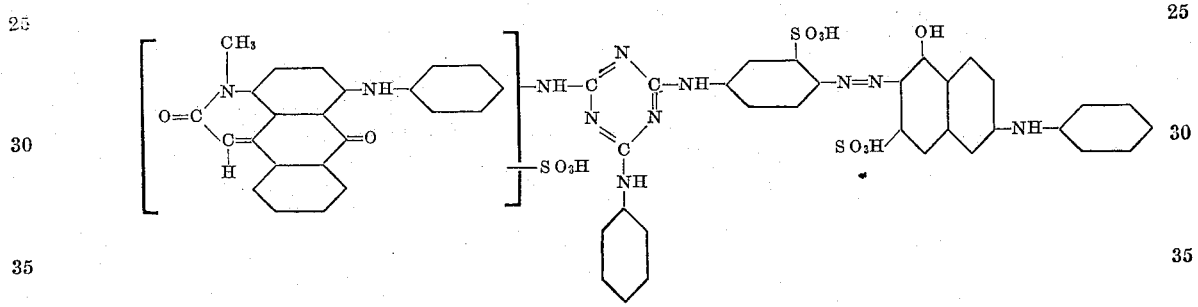

Similar dyestuffs are obtained if, instead of the condensation product from 1-amino-4-bromanthraquinone-2-sulfonic acid and 1:4-diaminobenzene-2-sulfonic acid there is used the corresponding condensation product from 1:4-diaminobenzene, benzidine and so on. So also the 1-amino-8-hydroxynaphthalene-3:6-disulfonic acid as starting component of the diazotizing component can be replaced by its isomers or by mono-sulfonic acids, or by simple aromatic amino-sulfonic acids of the benzene or naphthalene series. As diazotizing components there may be used any other amino-azo-dyestuffs which are capable of being diazotized.

*Example 8*

44.7 parts of the dyestuff obtained by condensation of N-methyl-4-bromo-1-anthrapyridone with 1:4-diaminobenzene and subsequent sulfonation are dissolved to a neutral solution in 2000 parts of water and condensed at 10–15° C. with 18.5 parts of cyanuric chloride in 500 parts of water. The reaction mixture is maintained neutral throughout by adding gradually, drop by drop, 50 parts of a solution of sodium carbonate of 10 per cent. strength. After several hours the temperature is raised to 35–40° C. and there is added in one portion a solution in 1000 parts of water of 51.4 parts of the azo dyestuff obtained from diazotized 1-amino-4-nitrobenzene-2-sulfonic acid and 2-phenylamino-5-hydroxynaphthalene-7-sulfonic acid with subsequent reduction of the nitro-group to the amino-group by means of sodium sulfide. The whole is stirred for 24–30 hours at 35–40° C., the reaction being maintained neutral throughout. Then 18.6 parts of aniline are added and the whole is heated for 2 hours at 90–95° C. The dyestuff formed of the formula is worked up in the usual manner. It dyes cotton and viscose a beautiful blue-red.

If in this example, instead of the mono-azo-dyestuffs, there is used the disazo-dyestuff obtained by combining the diazotized mono-azo-dyestuff from diazotized 1-amino-8-hydroxynaphthalene-3:6-disulfonic acid and 1-amino-2-methoxy-5-methylbenzene with 2-amino-5-hydroxynaphthalene-7-sulfonic acid there is obtained a dyestuff which dyes blue-violet.

The replacement of the aniline in the dyestuff of the first paragraph of this example by a second molecule of the azo-dyestuff leads also to a red dyestuff. A dyestuff dyeing orange tints is obtained by replacing the aniline by a yellow mono-azo-dyestuff, such as the 4'-amino-4-hydroxy-azo-benzene-3-carboxylic acid.

*Example 9*

A solution of 16.2 parts of 4-methyl-2:6-dichloro-pyrimidine in 400 parts of acetone is mixed with a solution of 25.7 parts of 4-amino-4'-hydroxy-1:1'-azobenzene-3'-carboxylic acid in 800 parts of water and the whole is heated for several hours in an apparatus having a descending cooler at 40–60° C. whilst well stirring, the liberated acid being neutralized by the addition of a dilute solution of sodium carbonate. When the condensation is finished there is added a solution of 48.9 parts of 1-amino-4-(4'-amino-3'-sulfo)-anilidoanthraquinone-2-sulfonic acid in 2000 parts of water, the temperature is raised to 80–100° C. and the whole is stirred for several hours in an apparatus having a descending cooler, the reaction being maintained neutral throughout. The whole is then allowed to cool, 10 parts of sodium carbonate are added and the dyestuff formed is salted out; it may be purified by recrystallization from water. The product of the formula

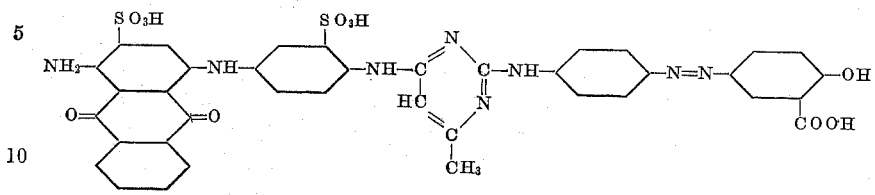

dyes cotton and viscose yellowish-green shades which are fast to light.

The same dyestuff is obtained if the 1-amino-4-(4'-amino-3'-sulfo)-anilidoanthraquinone-2-sulfonic acid is first condensed with the methyldichloropyrimidine or also if the amino-azo-dyestuff and the anthraquinone derivative are caused to react simultaneously with the pyrimidine derivative.

Example 10

47.3 parts of the intermediate product obtained by condensation of 1-amino-4-bromanthraquinone-2-sulfonic acid with 1-acetylamino-3-benzene-sulfamide and subsequent saponification of the acetylamino-group are dissolved to a neutral solution in 1500 parts of water and condensed with 18.5 parts of cyanuric chloride in the usual manner at 10–15° C. To the reaction mass, which is a thick liquid, is added a solution of 45.3 parts of the azo-dyestuff from diazotized 1-methoxy-2-amino-4-benzene-sulfonic acid and 2-amino-5-hydroxynaphthalene-7-sulfonic acid in 1200 parts of water. The temperature is raised to 35–40° C. and the reaction is maintained neutral by addition of a dilute solution of sodium carbonate. After 24 hours 18.6 parts of aniline are added and the whole is stirred for 2 hours longer at 90–95° C. The whole is then made alkaline with sodium carbonate and the finished dyestuff of the formula

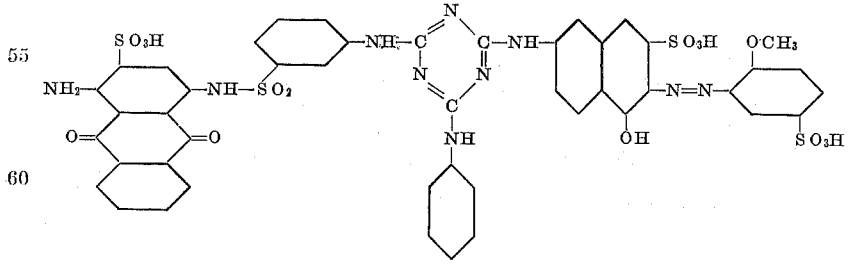

is salted out. It dyes cotton and viscose bluish-red shades.

Example 11

31.9 parts of 1:4-hydroxyaminoanthraquinone-5-sulfonic acid are dissolved to a neutral solution in 1200 parts of water and condensed at 10–15° C. with 18.5 parts of cyanuric chloride in 500 parts of water, the liberated acid being neutralized by means of 5.3 parts of sodium carbonate in 100 parts of water. Then there is added a solution of 45.3 parts of the azo dyestuff from diazotized 1-methoxy-2-amino-4-benzene-sulfonic acid and 2-amino-5-hydroxynaphthalene-7-sulfonic acid in 1200 parts of water, the temperature is raised to 35–40° C. and further 5.3 parts of sodium carbonate are added gradually so as to maintain the reaction neutral throughout. When the condensation is finished 18.6 parts of aniline are added and the whole is stirred for 2 hours longer at 90–95° C. The finished dyestuff of the formula

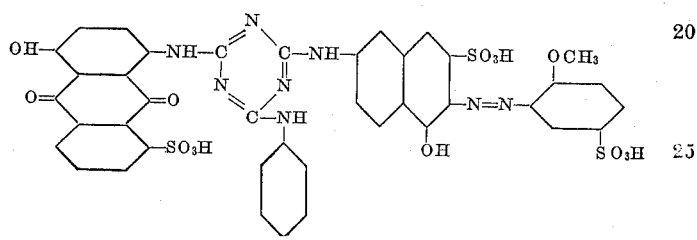

is worked up in the usual manner. It dyes cotton and viscose yellowish-red shades.

A dyestuff which dyes yellow shades is obtained if, instead of the aminoazo-dyestuff used in this example, there is used 4-amino-4'-hydroxy-1:1'-azobenzene-3'-carboxylic acid.

Example 12

A dyebath is prepared with 2 per cent. of the dyestuff made as described in the first paragraph of Example 1 and 2 per cent. of sodium carbonate. Cotton is entered at 60° C., and the bath is raised to boiling. After a quarter of an hour 30 per cent. of sodium sulfate is added and boiling is continued for half an hour longer. The cotton is dyed green shades which are fast to light.

What we claim is:

1. Process for the manufacture of dyestuffs, consisting in combining a blue α-amino-anthraquinone dyestuff containing at least one primary amino-group with a yellow aminoazo-dyestuff with the aid of a heterocyclic compound characterized by a heterocyclic six-membered ring consisting itself only of N and C atoms and of at least 3 and at the most 4 carbon atoms and of at least 2 and at the most 3 nitrogen atoms, and in which ring the atom grouping

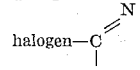

is present at least twice and at the most three times, the amino-anthraquinone dyestuff and the yellow aminoazo-dyestuff being selected in such a manner that at least one of the two components contains a sulfo-group.

2. Process for the manufacture of dyestuffs, consisting in combining a blue α-amino-anthraquinone dyestuff containing at least one primary amino-group with a yellow aminoazo-dyestuff with the aid of cyanuric chloride, the aminoanthraquinone dyestuff and the yellow aminoazodyestuff being selected in such a manner that at least one of the two components contains a sulfogroup.

3. Process for the manufacture of dyestuffs, consisting in combining blue aminoanthraquinone dyestuffs of the general formula

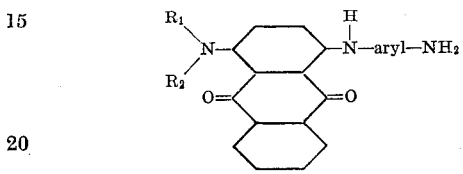

in which aryl stands for a mononuclear aryl nucleus, NH₂ stands in a position other than in ortho-position to the NH group, R₁ stands for a member of the group consisting of hydrogen, alkyl, aralkyl and aryl and R₂ stands for a member of the group consisting of hydrogen, alkyl and aralkyl, with yellow aminoazo-dyestuffs with the aid of a heterocyclic compound characterized by a heterocyclic six-membered ring consisting itself only of N and C atoms, and of at least 3 and at the most 4 carbon atoms and of at least 2 and at the most 3 nitrogen atoms and in which ring the atom grouping

is present at least twice and at the most three times, the aminoanthraquinone dyestuffs and the aminoazodyestuffs being selected in such a manner that at least one of the two components contains a sulfo-group.

4. Process for the manufacture of dyestuffs, consisting in combining blue aminoanthraquinone dyestuffs of the general formula

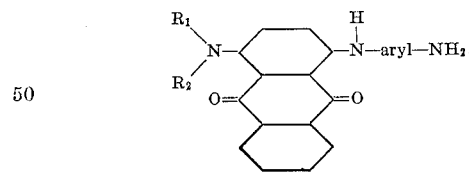

in which aryl stands for a mononuclear aryl nucleus, NH₂ stands in a position other than in ortho position to the NH group, R₁ stands for a member of the group consisting of hydrogen, alkyl, aralkyl and aryl, and R₂ stands for a member of the group consisting of hydrogen, alkyl and aralkyl, with yellow aminoazo-dyestuffs with the aid of a cyanuric chloride, the aminoanthraquinone dyestuffs and the aminoazo-dyestuffs being selected in such a manner that at least one of the two components contains a sulfo-group.

5. The dyestuffs containing, on the one hand, at least once the radical of a blue aminoanthraquinone dyestuff of the formula

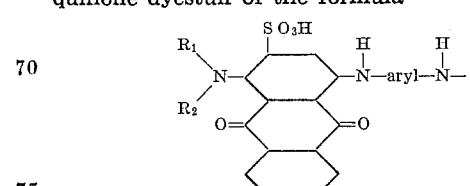

in which aryl stands for a mononuclear aryl nucleus, the two NH groups stand in a position other than in ortho-position to each other, R₁ stands for a member of the group consisting of hydrogen, alkyl, aralkyl and aryl, and R₂ stands for a member of the group consisting of hydrogen, alkyl and aralkyl, and, on the other hand, at least once the radical of a yellow aminoazo-dyestuff, in which dyestuffs these radicals are linked together by a halide of a heterocylic compound characterized by a heterocyclic six-membered ring consisting itself only of N and C atoms and of at least 3 and at the most 4 carbon atoms and of at least 2 and at the most 3 nitrogen atoms, and in which ring the atom grouping

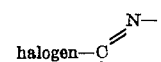

is present at least twice and at the most three times, which products are dark powders dissolving in water to blue-green to green-yellow and olive solutions, and dyeing textiles consisting of cellulose similar tints.

6. The dyestuffs containing, on the one hand, at least once the radical of a blue aminoanthraquinone dyestuff of the formula

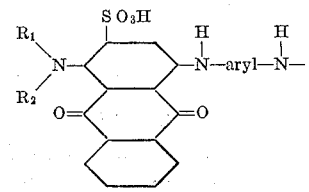

in which aryl stands for a mononuclear aryl nucleus, the two NH groups stand in a position other than in ortho-position to each other, R₁ stands for a member of the group consisting of hydrogen, alkyl, aralkyl and aryl, and R₂ stands for a member of the group consisting of hydrogen, alkyl and aralkyl, and, on the other hand, at least once the radical of a yellow aminoazo dyestuff, in which dyestuffs these radicals are linked together by the radical of cyanuric acid, which products are dark powders dissolving in water to bluegreen to green-yellow and olive solutions, and dyeing textiles consisting of cellulose similar tints.

7. The dyestuffs containing, on the one hand, at least once the radical of a blue aminoanthraquinone dyestuff of the formula

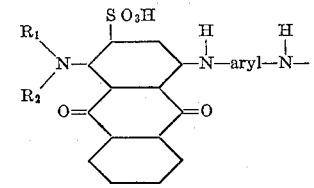

in which aryl stands for a mononuclear aryl nucleus, the two NH groups stand in a position other than in ortho-position to each other, R₁ stands for a member of the group consisting of hydrogen, alkyl, aralkyl and aryl, and R₂ stands for a member of the group consisting of hydrogen, alkyl and aralkyl, and, on the other hand, at least once the radical of a yellow aminoazo dyestuff, in which dyestuff these radicals are linked together by the radical of cyanuric acid, and in which further at least the blue anthraquinone dyestuff radical contains at least two sulfonic groups, which products are dark powders dissolving in water to blue-green to green-yellow and olive solutions, and dyeing textiles consisting of cellulose similar tints.

8. Process for the manufacture of dyestuffs, consisting in combining blue aminoanthraquinone dyestuffs of the general formula

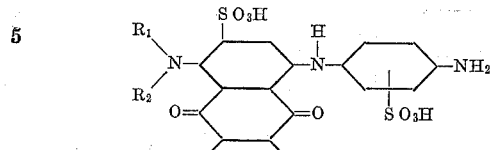

in which $R_1$ stands for a member of the group consisting of hydrogen, alkyl, aralkyl and aryl, and $R_2$ stands for a member of the group consisting of hydrogen or alkyl, with yellow mono-aminomono-azo-dyestuffs with the aid of cyanuric chloride.

9. Process for the manufacture of dyestuffs, consisting in combining a blue amino-anthraquinone dyestuff of the formula

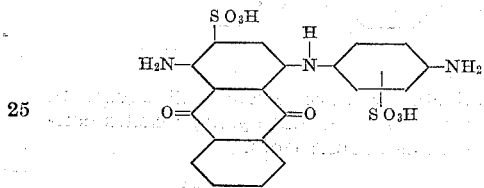

with yellow mono-aminomono-azo-dyestuffs with the aid of cyanuric chloride.

10. Process for the manufacture of dyestuffs, consisting in combining a blue amino-anthraquinone dyestuff of the formula

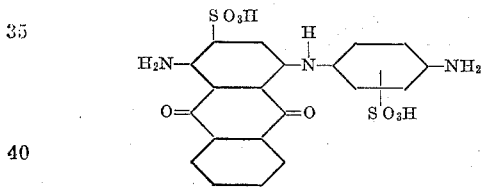

with an azo-dyestuff of the general formula

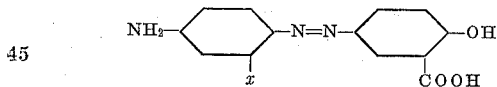

in which $x$ stands for a member of the group consisting of hydrogen and methyl with the aid of cyanuric chloride.

11. Process for the manufacture of a dyestuff, consisting in combining a blue amino-anthraquinone dyestuff of the formula

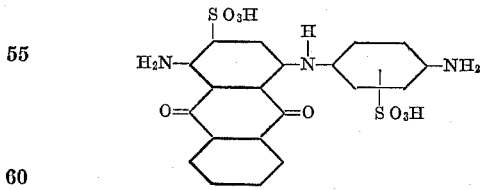

with the azo-dyestuff of the formula

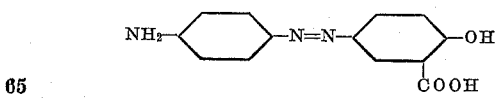

with the aid of cyanuric chloride.

12. The dyestuffs of the general formula

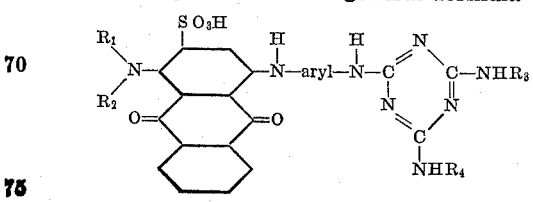

in which $R_1$ stands for a member of the group consisting of hydrogen, alkyl, aralkyl and aryl, $R_2$ stands for a member of the group consisting of hydrogen, alkyl and aralkyl, $R_3$ stands for the radical of an aminoazo-dyestuff and $R_4$ stands for the radical of an organic amino-compound which is colorless to yellow, which products are dark powders dissolving in water to green solutions and dyeing textiles consisting of cellulose green tints.

13. The dyestuffs of the general formula

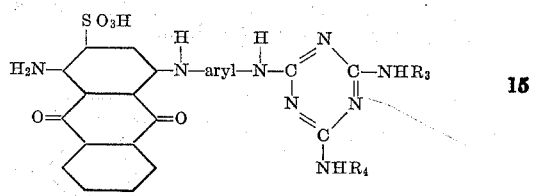

in which $R_3$ stands for the radical of an aminoazo-dyestuff and $R_4$ stands for the radical of an organic amino-compound which is colorless to yellow, which products are dark powders dissolving in water to green solutions and dyeing textiles consisting of cellulose green tints.

14. The dyestuffs of the general formula

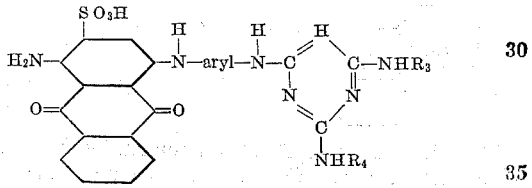

in which aryl stands for mononuclear aryl nucleus, $R_3$ stands for the radical of an aminoazo-dyestuff and $R_4$ stands for the radical of an organic amino-compound which is colorless to yellow, which products are dark powders dissolving in water to green solutions and dyeing textiles consisting of cellulose green tints.

15. The dyestuffs of the general formula

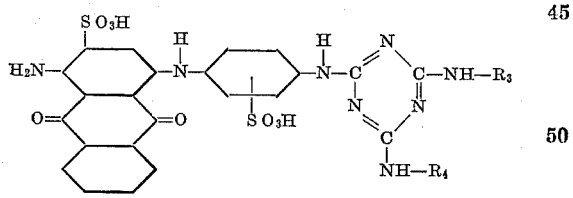

in which $R_3$ stands for the radical of an aminoazo-dyestuff and $R_4$ stands for the radical of an organic amino-compound which is colorless to yellow, which products are dark powders dissolving in water to green solutions and dyeing textiles consisting of cellulose green tints.

16. The dyestuffs of the general formula

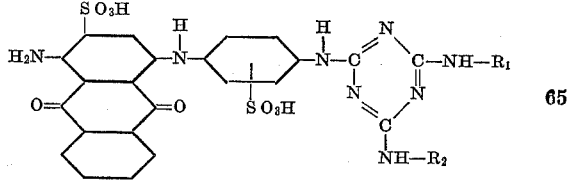

in which $R_1$ stands for the radical of a yellow aminoazo-dyestuff and $R_2$ stands for the radical of a colorless amino-compound, which products are dark powders dissolving in water to green solutions and dyeing textiles consisting of cellulose green tints.

17. The dyestuffs of the general formula

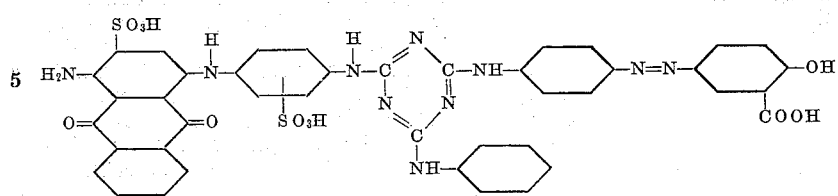

which products are dark powders dissolving in water to green solutions and dyeing textiles consisting of cellulose green tints.

18. The dyestuffs of the general formula

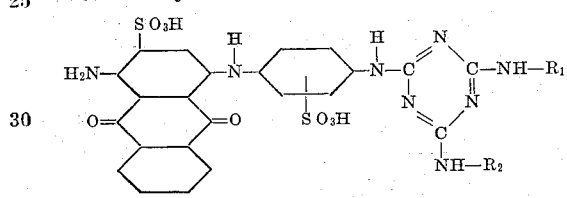

in which $R_1$ and $R_2$ stand for radicals of yellow aminoazo-dyestuffs, which products are dark powders dissolving in water to green solutions and dyeing textiles consisting of cellulose green tints.

19. The dyestuffs of the general formula

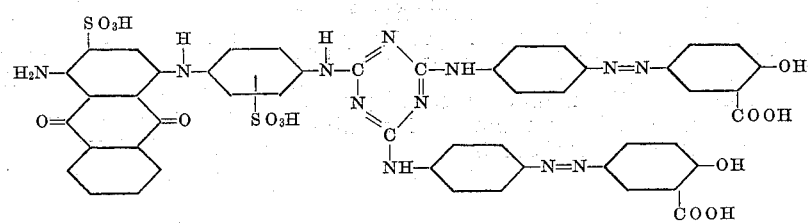

which products are dark powders dissolving in water to green solutions and dyeing textiles consisting of cellulose green tints.

HANS GUBLER.
EDUARD BERNASCONI.